(12) United States Patent
Smith et al.

(10) Patent No.: US 11,941,421 B1
(45) Date of Patent: Mar. 26, 2024

(54) EVALUATING AND SCALING A COLLECTION OF ISOLATED EXECUTION ENVIRONMENTS AT A PARTICULAR GEOGRAPHIC LOCATION

(71) Applicant: Splunk Inc., San Francisco, CA (US)

(72) Inventors: Patrick Joseph Smith, Atlanta, GA (US); Michael Beasley, Atlanta, GA (US)

(73) Assignee: Splunk Inc., San Francisco, CA (US)

( * ) Notice: Subject to any disclaimer, the term of this patent is extended or adjusted under 35 U.S.C. 154(b) by 92 days.

(21) Appl. No.: 17/305,550

(22) Filed: Jul. 9, 2021

(51) Int. Cl.
| G06F 9/455 | (2018.01) |
| G06F 9/445 | (2018.01) |
| G06F 9/48  | (2006.01) |
| G06F 9/50  | (2006.01) |

(52) U.S. Cl.
CPC ...... *G06F 9/45537* (2013.01); *G06F 9/44505* (2013.01); *G06F 9/45545* (2013.01); *G06F 9/4881* (2013.01); *G06F 9/5077* (2013.01); G06F 2009/45587 (2013.01)

(58) Field of Classification Search
CPC ............. G06F 9/45537; G06F 9/44505; G06F 9/45545; G06F 9/4881; G06F 9/5077; G06F 2009/45587
See application file for complete search history.

(56) References Cited

U.S. PATENT DOCUMENTS

| 7,937,344 B2 | 5/2011 | Baum et al. |
| 8,060,466 B1 | 11/2011 | Round et al. |
| 8,112,425 B2 | 2/2012 | Baum et al. |
| 8,751,529 B2 | 6/2014 | Zhang et al. |
| 8,788,525 B2 | 7/2014 | Neels et al. |
| 8,983,912 B1 | 3/2015 | Beedgen et al. |
| 9,135,560 B1 | 9/2015 | Saurabh et al. |

(Continued)

FOREIGN PATENT DOCUMENTS

KR 101810762 B1 6/2017

OTHER PUBLICATIONS

Brian Beach; Pro PowerShell for Amazon Web Services; 2nd edition (Year: 2019).*

(Continued)

*Primary Examiner* — Dong U Kim
(74) *Attorney, Agent, or Firm* — Koobbe, Martens, Olson & Bear, LLP

(57) ABSTRACT

A method for evaluating metrics associated with isolated execution environments utilized for synthetic monitoring of a web application and modifying the quantity of isolation execution environments hosted by a particular hosting service at a particular geographic location based on the metrics. The method can include receiving an instruction to monitor computing resources at the particular geographic location; obtaining configuration data for the particular geographic location; communicating a request to the particular hosting provider for an identification of a collection of isolated execution environments that are instantiated at the particular geographic location; obtaining metrics associated with the collection of isolated execution environments; evaluating the metrics against the set of scaling criteria; and/or generating an instruction for the particular hosting provider to modify the quantity of the collection of isolated execution environments.

20 Claims, 4 Drawing Sheets

(56) References Cited

U.S. PATENT DOCUMENTS

| | | | |
|---|---|---|---|
| 9,215,240 | B2 | 12/2015 | Merza et al. |
| 9,262,519 | B1 | 2/2016 | Saurabh |
| 9,286,413 | B1 | 3/2016 | Coates et al. |
| 9,342,571 | B1 | 5/2016 | Kurtic et al. |
| 9,853,986 | B2 | 12/2017 | Dash et al. |
| 10,127,258 | B2 | 11/2018 | Lamas et al. |
| 10,171,312 | B2 | 1/2019 | Kannan et al. |
| 10,223,145 | B1 | 3/2019 | Neogy et al. |
| 10,242,062 | B2 | 3/2019 | Turner |
| 10,346,775 | B1 | 7/2019 | Xu et al. |
| 10,419,469 | B1 | 9/2019 | Singh et al. |
| 10,445,311 | B1 | 10/2019 | Saurabh et al. |
| 10,474,656 | B1 | 11/2019 | Bronnikov et al. |
| 10,547,521 | B1 | 1/2020 | Roy et al. |
| 10,762,746 | B2 | 9/2020 | Liang et al. |
| 10,929,415 | B1 | 2/2021 | Shcherbakov et al. |
| 11,238,012 | B1 | 2/2022 | Liang et al. |
| 11,537,627 | B1 | 12/2022 | Baskaran et al. |
| 11,567,960 | B2 | 1/2023 | Shcherbkov et al. |
| 2005/0114707 | A1 | 5/2005 | DeStefano et al. |
| 2007/0174429 | A1 | 7/2007 | Mazzaferri et al. |
| 2007/0283194 | A1 | 12/2007 | Villella et al. |
| 2008/0162592 | A1 | 7/2008 | Huang et al. |
| 2010/0185961 | A1 | 7/2010 | Fisher et al. |
| 2011/0035248 | A1 | 2/2011 | Juillard |
| 2012/0246303 | A1 | 9/2012 | Petersen et al. |
| 2012/0259825 | A1 | 10/2012 | Tashiro et al. |
| 2012/0310899 | A1 | 12/2012 | Wasserman et al. |
| 2013/0042123 | A1* | 2/2013 | Smith ............... G06F 9/5077 713/300 |
| 2013/0117676 | A1 | 5/2013 | De Pauw et al. |
| 2013/0227349 | A1 | 8/2013 | Nodir et al. |
| 2013/0332424 | A1 | 12/2013 | Nos et al. |
| 2013/0332588 | A1 | 12/2013 | Maytal et al. |
| 2014/0040182 | A1 | 2/2014 | Gilder et al. |
| 2014/0047099 | A1 | 2/2014 | Flores et al. |
| 2014/0229607 | A1 | 8/2014 | Jung et al. |
| 2014/0278807 | A1 | 9/2014 | Bohacek |
| 2014/0278808 | A1 | 9/2014 | Iyoob et al. |
| 2014/0279201 | A1 | 9/2014 | Iyoob et al. |
| 2014/0324647 | A1 | 10/2014 | Iyoob et al. |
| 2014/0330832 | A1 | 11/2014 | Viau |
| 2015/0039651 | A1 | 2/2015 | Kinsely et al. |
| 2015/0039757 | A1 | 2/2015 | Petersen et al. |
| 2015/0149879 | A1 | 5/2015 | Miller et al. |
| 2015/0180891 | A1 | 6/2015 | Seward et al. |
| 2015/0271109 | A1 | 9/2015 | Bullotta et al. |
| 2015/0309710 | A1 | 10/2015 | Ashoori et al. |
| 2015/0341240 | A1 | 11/2015 | Iyoob et al. |
| 2015/0363851 | A1 | 12/2015 | Stella et al. |
| 2015/0369664 | A1 | 12/2015 | Garsha et al. |
| 2016/0019636 | A1 | 1/2016 | Adapalli et al. |
| 2016/0036903 | A1 | 2/2016 | Pal et al. |
| 2016/0043892 | A1 | 2/2016 | Hason et al. |
| 2016/0092475 | A1 | 3/2016 | Stojanovic et al. |
| 2016/0092558 | A1 | 3/2016 | Ago et al. |
| 2016/0094477 | A1 | 3/2016 | Bai et al. |
| 2016/0180557 | A1 | 6/2016 | Yousaf et al. |
| 2016/0198003 | A1 | 7/2016 | Luft |
| 2016/0246844 | A1 | 8/2016 | Turner |
| 2016/0271500 | A1 | 9/2016 | Nath et al. |
| 2016/0282858 | A1 | 9/2016 | Michalscheck et al. |
| 2016/0292166 | A1 | 10/2016 | Russell |
| 2016/0359955 | A1 | 12/2016 | Gill et al. |
| 2017/0046445 | A1 | 2/2017 | Cormier et al. |
| 2017/0061339 | A1 | 3/2017 | Littlejohn et al. |
| 2017/0085446 | A1 | 3/2017 | Zhong et al. |
| 2017/0085447 | A1 | 3/2017 | Chen et al. |
| 2017/0093645 | A1 | 3/2017 | Zhong et al. |
| 2017/0116321 | A1 | 4/2017 | Jain et al. |
| 2017/0228460 | A1 | 8/2017 | Amel et al. |
| 2017/0295181 | A1 | 10/2017 | Parimi et al. |
| 2017/0364538 | A1 | 12/2017 | Jacob et al. |
| 2017/0364540 | A1 | 12/2017 | Sigler |
| 2018/0012166 | A1 | 1/2018 | Devadas et al. |
| 2018/0027006 | A1 | 1/2018 | Zimmermann et al. |
| 2018/0115463 | A1 | 4/2018 | Sinha et al. |
| 2018/0165142 | A1 | 6/2018 | Harutyunyan et al. |
| 2018/0225345 | A1 | 8/2018 | Gilder et al. |
| 2018/0246797 | A1 | 8/2018 | Modi et al. |
| 2018/0321927 | A1 | 11/2018 | Borthakur et al. |
| 2018/0336027 | A1 | 11/2018 | Narayanan et al. |
| 2018/0367412 | A1 | 12/2018 | Sethi et al. |
| 2019/0018717 | A1 | 1/2019 | Feijoo et al. |
| 2019/0018844 | A1 | 1/2019 | Bhagwat et al. |
| 2019/0052542 | A1 | 2/2019 | Passante et al. |
| 2019/0098106 | A1* | 3/2019 | Mungel ............... H04L 67/02 |
| 2019/0155953 | A1 | 5/2019 | Brown et al. |
| 2019/0190773 | A1 | 6/2019 | Shi et al. |
| 2019/0306236 | A1 | 10/2019 | Wiener et al. |
| 2019/0310977 | A1* | 10/2019 | Pal ............... G06F 16/2455 |
| 2019/0312939 | A1 | 10/2019 | Noble |
| 2019/0324962 | A1 | 10/2019 | Turner |
| 2019/0342372 | A1* | 11/2019 | Lee ............... G06F 16/9024 |
| 2019/0379590 | A1 | 12/2019 | Rimar et al. |
| 2019/0386891 | A1 | 12/2019 | Chitalia et al. |
| 2020/0026624 | A1 | 1/2020 | Parthasarathy et al. |
| 2020/0034484 | A1 | 1/2020 | Arora et al. |
| 2020/0134359 | A1 | 4/2020 | Kim et al. |
| 2020/0099610 | A1 | 10/2020 | Heron |
| 2021/0105597 | A1* | 4/2021 | Wright ............... H04W 4/20 |
| 2022/0300464 | A1 | 9/2022 | Liang et al. |
| 2023/0169084 | A1 | 6/2023 | Shcherbakov |

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop on Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Add Docker metadata, Filebeat Reference 6.0, https://www.elastic.co/guide/en/beats/filebeat/6.0/add-docker-metadata.html, software version (6.0.0) realized 2017.

Beats Version 5.0.0. Release Notes [relating to version 5.0, allegedly released Oct. 2016] [online], [retrieved on Jan. 31, 2020]. Retrieved from the Internet :< URL: https://www.elastic.co/guide/en/beats/libbeat/current/release-notes-5.0.0.html>.

Filebeat Prospectors Configuration. Filebeat Reference [relating to version 5.0, allegedly released Oct. 2016] [version 5.0 allegedly released Oct. 2016] [online], [retrieved on Jan. 31, 2020]. Retrieved from the Internet: < URL:https://www.elastic.co/guide/en/beats/filebeat/5.0/configuration-filebeat-options.html>.

Perez-Aradros, C. Enriching Logs with Docker Metadata Using Filebeat. Elastic Blog [online], Jul. 2017 [retrieved on Jan. 31, 2020]. Retrieved from the Internet: < URL: https://www.elastic.co/blog/enrich-docker-logs-with-filebeat>.

Perez-Aradros, C. Shipping Kubernetes Logs to Elasticsearch with Filebeat. Elastic Blog [online], Nov. 2017 [retrieved on Jan. 31, 2020]. Retrieved from the Internet: < URL: https://www.elastic.co/blog/shipping-kubernetes-logs-to-elasticsearch-with-filebeat>.

Set up Prospectors. Filebeat Reference [relating to version 6.2, allegedly released Feb. 2018] [online], [retrieved on Jan. 31, 2020]. Retrieved from the Internet: < URL: https://www.elastic.co/guide/en/beats/filebeat/6.2/configuration-filebeat-options.html>.

TSG. 'Second proposal for JSON support'. In Elastic/Beats Pull Requests [online], Mar. 2016 [retrieved on Jan. 31, 2020]. Retrieved from the internet: <URL: https://github.com/elastic/beats/pull/1143>.

(56) References Cited

OTHER PUBLICATIONS

Vaid, Workshop on Managing Systems via log Analysis and Machine Learning Techniques (SLAML '10), ;login: vol. 36, No. 1, Oct. 3, 2010, Vancouver, BC, Canada.
U.S. Appl. No. 15/980,008, filed May 15, 2018, Modestino et al.
U.S. Appl. No. 18/146,256, filed Dec. 23, 2022, Baskaran et al.
Office Action in U.S. Appl. No. 15/979,933, dated Feb. 20, 2020, 17 pages.
Final Office Action in U.S. Appl. No. 15/979,933, dated Aug. 19, 2020 in 23 pages.
Office Action in U.S. Appl. No. 15/979,933, dated May 18, 2021 in 22 pages.
Notice of Allowance in U.S. Appl. No. 15/979,933, dated Sep. 17, 2021 in 12 pages.
Office Action in U.S. Appl. No. 16/262,746, dated Mar. 29, 2019, 14 pages.
Final Office Action in U.S. Appl. No. 16/262,746, dated Oct. 16, 2019, 15 pages.
Notice of Allowance in U.S. Appl. No. 16/262,746, dated Jan. 30, 2020, 17 pages.
Notice of Allowance in U.S. Appl. No. 16/262,746, dated Mar. 23, 2020, 9 pages.
Office Action in U.S. Appl. No. 17/646,372, dated Mar. 29, 2023, in 16 pages.
Notice of Allowance in U.S. Appl. No. 17/646,372, dated Jul. 19, 2023, in 12 pages.
Office Action in U.S. Appl. No. 15/980,008, dated May 7, 2020, 11 pages.
Final Office Action in U.S. Appl. No. 15/980,008, dated Oct. 20, 2020, in 19 pages.
Notice of Allowance in U.S. Appl. No. 15/980,008, dated May 13, 2021, in 13 pages.
Office Action in U.S. Appl. No. 16/148,918 dated May 18, 2020, in 12 pages.
Notice of Allowance in U.S. Appl. No. 16/148,918 dated Oct. 6, 2020, in 10 pages.
Office Action in U.S. Appl. No. 17/143,063 dated Feb. 18, 2022 in 15 pages.
Final Office Action in U.S. Appl. No. 17/143,063 dated Jul. 18, 2022 in 7 pages.
Notice of Allowance in U.S. Appl. No. 17/143,063 dated Sep. 28, 2022 in 9 pages.
Office Action in U.S. Appl. No. 18/160,972 dated Jul. 11, 2023 in 19 pages.
Office Action in U.S. Appl. No. 16/147,181 dated Dec. 21, 2020 in 31 pages.
Final Office Action in U.S. Appl. No. 16/147,181 dated Jun. 25, 2021 in 28 pages.
Office Action in U.S. Appl. No. 16/147,181 dated Nov. 12, 2021 in 27 pages.
Notice of Allowance in U.S. Appl. No. 16/147,181 dated Aug. 19, 2022 in 10 pages.
Office Action in U.S. Appl. No. 18/146,256 dated May 12, 2023 in 22 pages.
Notice of Allowance in U.S. Appl. No. 18/146,256 dated Sep. 6, 2023 in 17 pages.

* cited by examiner

US 11,941,421 B1

EVALUATING AND SCALING A COLLECTION OF ISOLATED EXECUTION ENVIRONMENTS AT A PARTICULAR GEOGRAPHIC LOCATION

FIELD

Various embodiments of the disclosure relate to location- and cloud-provider-specific scaling of virtual resources.

BACKGROUND

Users demand and depend on fast, reliable web services. To that end, it can be advantageous to assess web pages and web applications by simulating traffic with test variables (e.g. network, browser, location, device, etc.) to gain insight into a user's digital experience. Cloud computing can provide a means for performing the above-mentioned testing. For example, cloud-based service providers (e.g., Amazon, Microsoft, Google, Alibaba, etc.) offer cloud-computing services using physical servers located at various geographic locations around the world. However, the scalability of resources available from a particular cloud-based service provider and at a particular geographic location can be improved.

BRIEF DESCRIPTION OF THE DRAWINGS

The present disclosure is illustrated by way of example, and not limitation, in the figures of the accompanying drawings, in which like reference numerals indicate similar elements and in which.

DETAILED DESCRIPTION

Figure 1:
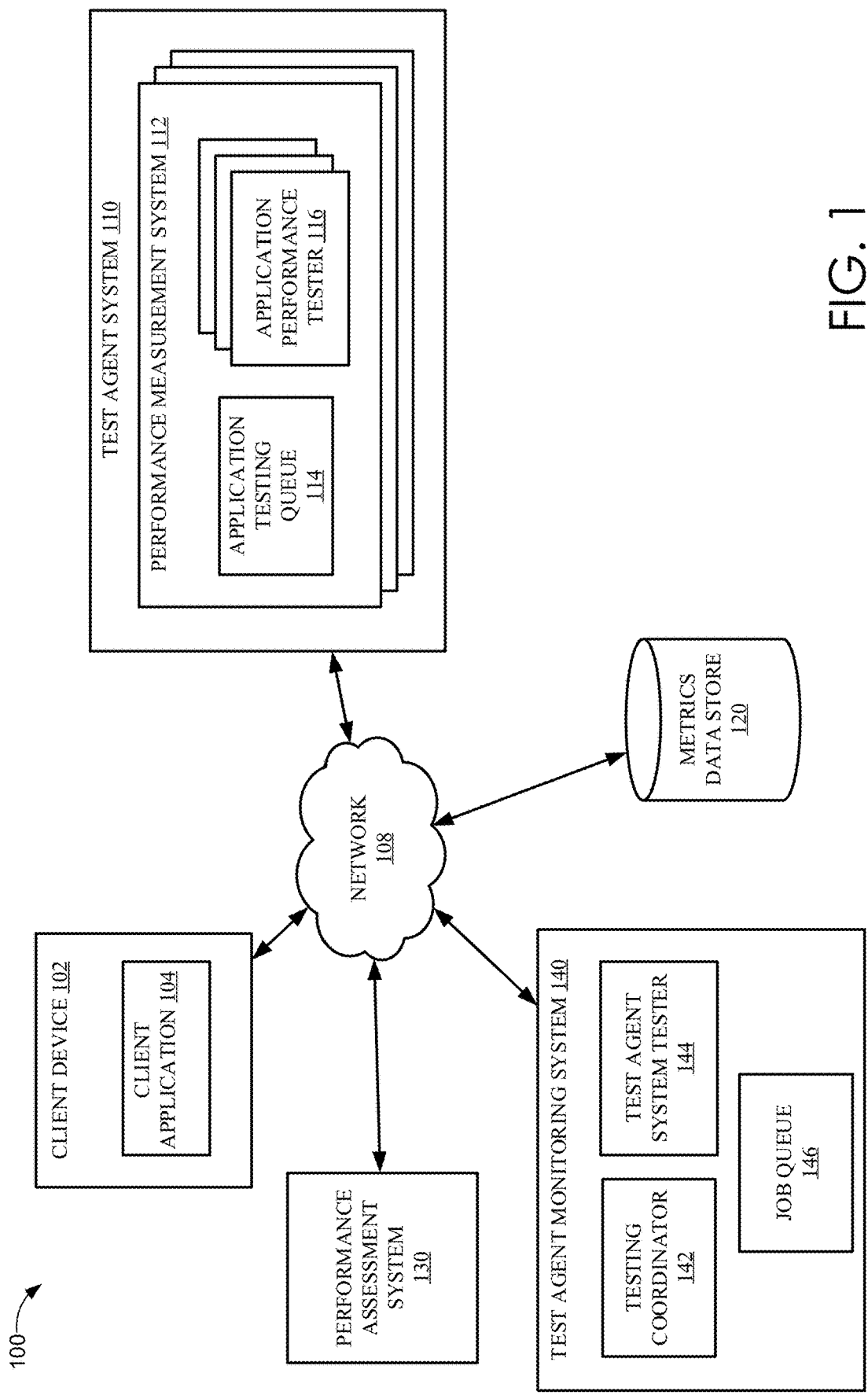
FIG. 1 illustrates an embodiment of an application performance monitoring environment.

Synthetic monitoring is a method of testing and assessing an application, such as a website, by simulating visitors and directing the path taken through the application. By simulating navigation to the website and/or an end-user's clickstream through basic navigation, form submission, shopping-cart transactions, or even online gaming, synthetic monitoring can reveal potential obstacles that may be negatively affecting the end-user's digital experience. While conventional synthetic monitoring can provide some testing of the application such as simulated traffic flow, generally it is unable to simulate visitors from a particular geographic location. Web performance may vary dramatically based on the location from which an end-user accesses the web page or web application. Consider a scenario where a user is running a website that targets visitors who are mainly in the Asia region. In such a circumstance, the user may desire to test the website using data centers that are located in or around the Asia region rather than, for example, data centers located in the U.S. Otherwise, the test results may not provide an accurate picture of how the website are performing from the perspective of the target visitors (i.e., visitors that access the website in the Asia region). Accordingly, being unable to simulate visitors from a particular geographic location can detract from the usefulness of the synthetic monitoring, especially when it is desirable to test the digital experience of users from a particular geographical region.

In some cases, synthetic monitoring can be performed using a set of virtual machines or other isolated execution environments. For example, data centers may be physically located at various geographic locations around the world, and one or more virtual machines may be instantiated on each of these data centers. In this way, a particular virtual machine can be utilized to perform synthetic monitoring from a particular geographic location (i.e., the location of is host data center). However, location-specific scaling criteria for scaling the virtual machines increases the technical challenge of providing a universal or normalized scaling solution that is applicable to multiple geographic locations and across discrete data center providers. Furthermore, space in data centers is often shared by more than one hosting provider (such as Amazon, Microsoft, Google, or Alibaba), with each using provider-specific rules for (and requiring provider-specific instructions to) scale the number of virtual machines. Thus, there is need for a normalized scaling solution that enables the dynamic scaling of virtual machines, without regard to location or hosting provider.

To address these and other concerns, a test agent monitoring system can be implemented to monitor and manage the isolated execution environments instantiated at each of the various data centers. In particular, the test agent monitoring system can identify the particular hosting provider(s) associated with a particular geographic location, identify the quantity of isolated execution environments at the particular geographic location (and/or hosted by a particular hosting provider), evaluate various metrics associated with their workload at the particular geographic location, and determine whether to modify the quantity of isolated execution environments using a set of provider- and/or location-specific scaling criteria. If a decision is made to scale the quantity of isolated execution environments at the particular geographic location, the test agent monitoring system can generate provider-specific instructions and communicate the provider-specific instructions to the appropriate hosting provider.

In light of the description herein, it will be understood that the embodiments disclosed herein substantially improve network scalability and resource utilization. Specifically, the embodiments disclosed herein enable a test agent monitoring system 140 to evaluate the computing resources at a particular geographic location based on location- and/or provider-specific scaling criteria and generate provider-specific instructions to modify the quantity of isolated execution environments at the particular geographic location. In particular, the test agent monitoring system 140 can identify the hosting provider(s) for the geographic location, identify scaling criteria associated with the hosting provider and/or the geographic location, obtain metrics and/or identification information associated with the isolated execution environments, evaluate the metrics against the scaling criteria, and generate provider-specific instructions to modifying the number of isolated execution environments based on the evaluation of the metrics. The ability to evaluate the metrics against location- and/or provider-specific scaling criteria and then generate a provider-specific instruction to scale the isolated execution environments at the particular geographic location enables the underlying systems to more efficiently perform synthetic monitoring by: automatically scaling resources in an efficient and effective manner, which provides greater network scalability and a more dynamic network topology; dynamically modifying the number or amount of computer resources used to for synthetic monitoring at a particular geographic location, which more efficiently uses resources; providing a standardized solution for scaling, which increases interoperability of resources across multiple hosting providers, etc.

Thus, the presently disclosed embodiments represent an improvement at least in the functioning of network devices and synthetic monitoring. Moreover, the presently disclosed embodiments address technical problems inherent within the networked systems and the Internet. These technical problems are addressed by the various technical solutions described herein, including the obtaining of configuration data for a particular geographic location, identifying the virtual machines hosted by a particular hosting provider at the particular geographic location, evaluating metrics against scaling criteria to make a scaling decision, and generating provider-specific instructions, etc. Thus, the present application represents a substantial improvement on existing distributed systems in general.

Environment Overview

FIG. 1 illustrates an embodiment of an application performance monitoring environment 100 that includes a network 108, a client device 102, a test agent system 110, a metrics data store 120, a performance assessment system 130, and a test agent monitoring system 140. To simplify discussion and not to limit the present disclosure, FIG. 1 illustrates only one client device 102, metrics data store 120, test agent system 110, performance assessment system 130, and test agent monitoring system 140, though multiple may be used.

Any of the foregoing components or systems of the environment 100 may communicate via the network 108. Although only one network 108 is illustrated, multiple distinct and/or distributed networks 160 may exist. The network 108 can include any type of communication network. For example, the network 108 can include one or more of a wide area network (WAN), a local area network (LAN), a cellular network (e.g., LTE, HSPA, 3G, and other cellular technologies), an ad hoc network, a satellite network, a wired network, a wireless network, and so forth. In some embodiments, the network 108 can include the Internet.

Any of the foregoing components or systems of the environment 100, such as any one or any combination of the client device 102, the metrics data store 120, the test agent system 110, the performance assessment system 130, or the test agent monitoring system 140 may be implemented using individual computing devices, processors, distributed processing systems, servers, isolated execution environments (e.g., virtual machines, containers, etc.), shared computing resources, or so on. Furthermore, any of the foregoing components or systems of the environment 100 may be combined and/or may include software, firmware, hardware, or any combination(s) of software, firmware, or hardware suitable for the purposes described.

The client application 104 may facilitate testing and assessing an online asset (e.g., API, web application, mobile application, website, web service, etc.), by simulating visitors and/or directing the path taken through the application. For example, the client application 104 may provide an interface through which a user can perform synthetic monitoring of their application, for instance by simulating visitor requests or projected clickstream to test for availability, performance, function, etc. In some cases, the client application 104 can provide an interface with which users can input or select various test variables (e.g., URL, browser, location, device type, testing frequency, flow path through the application, etc.) for the synthetic monitoring. In some such cases, the client application 104 (along with various components of the environment 100) can test and assess the online assets using the test variables. In this way, the client application 104 and the other components of the environment 100 can enable a user to test the performance of the online assets and gain insight into a visitor's digital experience.

Consider a scenario in which a user wishes to test her website: https://broomstogo.com/. To do so, she may access the client application 104 and may define the test variables as indicated in Table 1, below.

TABLE 1

| Test Variable | Value |
| --- | --- |
| URL | https://broomstogo.com/ |
| Testing frequency | every 30 minutes |
| Testing locations | Illinois, United States; Iowa, United States; N. Virginia, United States; Mexico City, Mexico |
| Steps | (1) Click Search; (2) Search for Broom; (3) Submit; (4) Click Broom 1; (5) Add to Cart; (6) Change Quantity; (7) Go back to Catalog; (8) Wait for Second Item to Appear; (9) Click Broom; (10) Add to Cart |
| Browser | Google Chrome |

Based on the test variables, the client application 104 can generate jobs (to be executed by application performance testers 116) and can add the jobs to one or more application testing queues 114. As described in more detail below, the jobs are executed by application performance testers 116. In some cases, the jobs are location-specific in that they require the job to be performed by an application performance tester 116 that is hosted by a particular cloud hosting provider or hosting service on a data center located at a particular geographic location. For example, Table 1 indicates that one of the testing locations is Illinois, United States. Accordingly, the job that is associated with that testing location can be performed by an application performance tester 116 that is hosted by a particular cloud hosting provider or hosting service in a data center located in Illinois. In this way, the synthetic monitoring can test the digital experience of users in Illinois and/or in some other geographical region.

As a non-limiting example, using the test variables list in Table 1, the client application 104 can generate four recurring jobs (one for each testing location) to be performed every 30 minutes (testing frequency). In particular, the client application 104 can generate one job for each testing location: Illinois, United States; Iowa, United States; N. Virginia, United States; Mexico City, Mexico. Furthermore, each of the four jobs can include instructions navigate to the URL (https://broomstogo.com/) using a Google Chrome Browser and then performing the steps of (1) Click Search; (2) Search for Broom; (3) Submit; (4) Click Broom 1; (5) Add to Cart;

(6) Change Quantity; (7) Go back to Catalog; (8) Wait for Second Item to Appear; (9) Click Broom; and (10) Add to Cart. As described in more detail below, the test agent system 110 may include a performance measurement system 112, an application testing queue 114, and one or more application performance testers 116 for each geographic location. In some such cases, the client application 104 can populate a particular application testing queue 114 with jobs that correspond to the associated geographic location. Although this example describes the client application 104 as generating the jobs and placing them into the application testing queue 114, it will be understood that one or other components of the environment 100 may perform any of these functions.

The client application 104 may include a web browser, a mobile application or "app," a background process that performs various operations with or without direct interaction from a user, or a "plug-in" or "extension" to another application, such as a web browser plug-in or extension. Although FIG. 1 illustrates the client application 104 as being implemented on the client device 102, it will be understood that any of the components or systems of the environment 100 may host, execute, or interact with the client application 104. Furthermore, in some cases, the client application 104 may be hosted or executed by one or more host devices (not shown), which may broadly include any number of computers, virtual machine instances, and/or data centers that are configured to host or execute one or more instances of the client application 104.

The client device 102 represents any computing device capable of interacting with or running the client application 104. Examples of client devices 102 may include, without limitation, smart phones, tablet computers, handheld computers, wearable devices, laptop computers, desktop computers, servers, portable media players, gaming devices, and so forth.

The test agent system 110 executes the jobs in the application testing queues 122, collects performance metrics associated with the execution of the jobs, and communicates the performance metrics to one or more components of the environment 100, such as the performance assessment system 130, the metrics data store 120, or the client application 104. In the illustrated embodiment, the test agent system 110 includes a plurality of performance measurement systems 112, where each performance measurement system 112 includes an application testing queue 114 and one or more application performance testers 116. However, it will be understood that the components of the test agent system 110 may vary across embodiments. For example, in some cases, the test agent system 110 may include fewer or more application testing queues 114 than performance measurement systems 112.

An application performance tester 116 can be implemented using containerization or operating-system-level virtualization, or other virtualization techniques, such as virtual machines. Each application performance tester 116 on a particular host computing system can have certain resources (e.g., memory, processor, etc.) of the underlying host computing system assigned to it, but may share the same operating system and may use the operating system's system call interface and/or or may share other compute resources. In certain cases, each application performance tester 116 can be implemented within an isolated execution environment on the host computing device, where the isolated execution environment provides a memory space of the host computing device that is logically isolated from memory space of other isolated execution environments. Further, each application performance tester 116 may run the same or different computer applications concurrently or separately, and may interact with each other. It will be understood that various virtualization techniques can be used to implement the application performance testers 116. For example, the application performance testers 116 can be implemented using virtual machines using full virtualization or paravirtualization, etc. As another example, each application performance tester 116 can be implemented as separate software containers or container instances. Thus, where reference is made to an application performance tester 116, it should be understood that it may be implemented in any isolated execution environment, such as a virtual machine environment or containerized environment.

In some cases, each application performance tester 116 may be associated with a particular geographic location. As mentioned above, each data center may be physically located in a particular geographic location. Furthermore, each data center may include one, tens, hundreds, thousands, or more host computing devices and a collection of application performance testers 116 can be implemented within one or more isolated execution environments on each host computing device. Thus, in some cases, an application performance tester 116 may be associated with the geographic location at which its host data center is located. Consider a scenario where a first data center is located in Germany and is the host data center for 5 application performance testers 116. In such a scenario, each of the 5 application performance testers 116 may be associated with the geographic location of Germany, since they use the first data center as their underlying host data center.

In some cases, each application performance tester 116 may be associated with a particular hosting provider. For example, an application performance tester 116 may be hosted using a particular hosting service (e.g., Microsoft Azure, Google Cloud Platform, Alibaba Cloud, etc.) of a particular hosting provider (e.g., Amazon, Microsoft, Google, Alibaba, etc.). In some such cases, an application performance tester 116 may be associated with the hosting provider or hosting service that was used to instantiate it. Consider a scenario where a first application performance tester 116 was instantiated using Microsoft Azure and a second application performance tester 116 was instantiated using Alibaba Cloud. In such a scenario, the first application performance tester 116 may be associated with Microsoft Azure (hosting service) or Microsoft (hosting provider) and the second application performance tester 116 may be associated with Alibaba Cloud (hosting service) or Alibaba (hosting provider).

Space in data centers is often shared by more than one hosting provider. Therefore, in some cases, application performance testers 116 may be associated with the same (or different) geographic location but may be associated with different hosting services/providers. Consider a scenario in which a first data center is located in Germany and is the host data center for a third application performance tester 116 and a fourth application performance tester 116. Furthermore, consider the situation where the third application performance tester 116 was instantiated using Microsoft Azure and the fourth application performance tester 116 was instantiated using Alibaba Cloud. In such a scenario, the third application performance tester 116 may be associated with Germany (geographic location) and Microsoft (hosting provider) and the fourth application performance tester 116 may be associated with Germany (geographic location) and Alibaba (hosting provider).

The application testing queues 114 can includes jobs to be executed by the application performance testers 116. For example, as described, the client application 104 may generate one or more jobs based on the input variables and the jobs may be added to the application testing queue 114. Similar to the application performance testers 116, in some cases the application testing queues 114 (and/or the jobs on the application testing queues 114) are associated with a particular geographic location and/or a particular hosting provider. For example, a particular application testing queue 114 may only include jobs associated with a particular geographic location and/or a particular hosting provider. In this way, the test agent system 110 can include different application testing queues 114 (and different performance measurement systems 112) for each geographic location and/or each particular hosting provider.

In some cases, an application testing queue 114 may include jobs corresponding to different online assets. For example, the jobs on the application testing queue 114 may correspond to multiple website performance tests. Consider a scenario where User A requests a performance test of "Website A.com" from Locations A and C using cloud providers X and Y and User B requests a performance test of "Website B.com" from Location B and D using cloud provider Z. In some cases, both of these jobs may be placed in the same application testing queue 114, since they will be executed by the same set of application performance testers 116.

In some cases, as part of executing a job, the application performance tester 116 can monitor various performance metrics, such as, but not limited to, Google Lighthouse Performance Score, Google Web Vitals such as Largest Contentful Paint (LCP), Total Blocking Time (TBT), Cumulative Layout Shift (CLS), Time to First Byte (TTFB), Speed Index (SI), Time to Interactive (TTI), Visually Complete (VC) and custom W3C user timings, response time, server time, time taken to execute the job, a job identifier, an online asset (e.g., website) identifier, etc. The application performance tester 116 can communicate the performance metrics to one or more components of the environment, such as the performance assessment system 130, the metrics data store 120, or the client application 104.

The performance assessment system 130 receives the performance metrics from the test agent system 110 and/or the metrics data store 120 and processes them to obtain results. In some cases, the performance assessment system 130 can provide an indication of the results. For example, the performance assessment system 130 can track, trend, graph, or create an alert for the performance metrics. In some cases, the performance assessment system 130 can issue an alert or notification if the test website or performance metrics does not satisfy criteria (unavailable, slow, etc.). In some cases, the alert can be real-time via SMS, email or phone, or through a number of turnkey integrations (Slack, PagerDuty, Opsgenie, Datadog, and more) or custom webhooks.

The metrics data store 120 can be used to manage data within the application performance monitoring environment 100. In some cases, the metrics data store 120 can manage or store configuration data. Configuration data can include, but is not limited to, data relating to geographic locations, hosting providers, application performance testers 116, scaling criteria, or metrics. For example, the configuration data may include geographic location identifiers that can be used to identify various geographic locations. As described herein, data centers can be located at various physical locations around the world. In some cases, the metrics data store 120 stores geographic location identifiers for some or all of the data centers, such as those data centers that are enabled. For purposes of this disclosure, a particular data center is "enabled" if that data center is the underlying host for at least one application performance tester 116. As a corollary, a geographic location may be referred to as being "enabled" if an enabled data center is located at that geographic location.

As another example, the configuration data may include hosting provider identifiers that can be used to identify various hosting providers. As described herein, various hosting providers can be utilized to host the application performance testers 116. In some cases, the metrics data store 120 stores hosting provider identifiers for some or all of the geographic locations, such as those geographic locations that are enabled. For example, the configuration data can indicate a mapping or an assignment between the various geographic locations and hosting providers. In particular, configuration data can indicate which hosting provider(s) are hosting one or more application performance testers 116 at each geographic location. Consider a scenario in which two application performance testers 116 are hosted by a first hosting provider at a first geographic location and two other application performance testers 116 are hosted by a second hosting provider at the first geographic location. In some such cases, the configuration data can indicate a mapping between the first hosting provider and the first geographic location, and can also indicate a mapping between the hosting provider and the first geographic location.

In some cases, the configuration data may include data relating to metrics of the test agent system 110, such as metrics relating to an application testing queue 114 or application performance tester 116. For example, the metrics can include, but are not limited to, a backlog of the application testing queue 114, an average backlog of the application testing queue 114 over a particular period of time, the frequency or amount of jobs being placed on the application testing queue 114, a workload of a set of application performance testers 116, the frequency or amount of jobs being placed on the application testing queue 114, etc. In some cases, the metrics data store 120 may include an indication of where or how to find metrics, instead of the metrics themselves. For example, the metrics data store 120 can store references to a location in one or more data stores that store the metrics. In some such cases, the test agent monitoring system 120 can retrieve the reference from the metrics data store 120 and then obtain the metrics from the referenced location.

In some cases, the configuration data may include scaling criteria. In some cases, the scaling criteria can provide rules for determining whether to modify the quantity of application performance testers 116 at a particular geographic location and/or hosted by a particular hosting provider. For example, the scaling criteria may indicate to scale the quantity of application performance testers 116 if one or more metrics satisfy or fail to satisfy a corresponding threshold. For instance, if the backlog of application testing queue 114 satisfies a backlog threshold, the scaling criteria can indicate to increase the quantity of application performance testers 116. As another example, if the backlog in the application testing queue 114 fails to satisfy a backlog threshold (e.g., 0, 1, 2, etc.), the scaling criteria can indicate to decrease the quantity of application performance testers 116. In some cases, the scaling criteria can indicate modifications to the quantity as relative changes. For example, the scaling criteria may indicate to scale the quantity of application performance testers 116 by a specified amount (e.g., add 2) if certain conditions are met. In some cases, the scaling criteria can indicate modifications to the quantity as absolute changes. For example, the scaling criteria may indicate to scale the quantity of application performance testers 116 to a particular quantity (e.g., set the total to 30) if certain conditions are met. In some cases, the scaling criteria can vary based on geography, data center location, and/or hosting provider.

A particular hosting provider can host one or more application performance testers 116 on the compute resources. In general, each hosting provider enables scaling in that it allows the quantity of application performance testers 116 that it hosts to be increased or decreased. However, the particular technique for scaling quantity of application performance testers 116 can vary across hosting providers. For example, each hosting provider can require its own credentials. As another example, some hosting providers require the transmission of a particular set of parameters in order to scale, while others may require a hosting-provider-specific API to be called. Furthermore, some hosting providers may only accept relative changes to the quantity (e.g., add 3, remove 4, etc.), while other hosting providers may only accept absolute changes to the quantity (e.g., set quantity to 25). These different requirements among hosting providers increase the technical challenge of standardizing a procedure for scaling the application performance testers 116 without regard to the hosting provider.

To address these challenges, the scaling criteria can include provider-specific instructions for interacting with each hosting provider. For example, the scaling criteria can include one or more Lambda functions for each hosting provider. In some cases, the use of the Lambda functions to interact with the hosting providers can standardize the procedure performed by the test agent monitoring system 140 when evaluating the performance measurement systems 112 and/or modifying the quantity of application performance testers 116. For example, each Lambda function may obtain and/or communicate a set of common parameters that are provided when invoked. These common parameters may be parameters that some or all hosting providers use, such as, but not limited to, provider-specific credentials, production, staging, provider-specific region code, etc. Furthermore, each Lambda function obtain and/or communicate provider-specific parameters when invoked. These provider-specific parameters may be required for functionality for the particular hosting provider. In some cases, multiple Lambda functions are created for each hosting provider. For example, different Lambda functions can be used to perform different jobs such as returning the quantity of application performance testers 116 hosted by the hosting provider at a particular geographic location, scaling the quantity of application performance testers 116 hosted by the hosting provider at a particular geographic location, etc.

In some cases, the metrics data store 120 can be maintained by pinging components of the test agent system 110, test agent monitoring system 140, or performance assessment system 130 for information or passively receiving it based on the components independently reporting the information. For instance, the metrics data store 120 can ping or receive information from the application performance testers 116 at predetermined intervals of time, such as every X number of seconds, or every X minute(s), etc. In addition or alternatively, the application performance testers 116 can be configured to automatically send their data to the metrics data store 120 and/or the metrics data store 120 can ping a particular application performance tester 116 after the passage of a predetermined period of time (for example, every X number of seconds or every X minutes) since the metrics data store 120 requested and/or received data from that particular application performance tester 116. In some cases, the application performance testers 116 can communicate data to the metrics data store 120 responsive to a particular event (e.g., its instantiation, after processing a job from the application testing queue 114, etc.). In some cases, the application performance testers 116 communicates configuration data (e.g., geographic location, hosting provider, etc.) to the metrics data store 120.

The metrics data store 120 can include or be implemented as cloud storage, such as Amazon Simple Storage Service (S3), Elastic Block Storage (EBS) or CloudWatch, Google Cloud Storage, Microsoft Azure Storage, InfluxDB, etc. The metrics data store 120 can be made up of one or more data stores storing data that has been received from one or more of the client device 102, the client application 104, the test agent system, the performance assessment system 130, or the test agent monitoring system 140. The metrics data store 120 can be configured to provide high availability, highly resilient, low loss data storage. The metrics data store 120 can include Amazon CloudWatch metrics. In some cases, to provide the high availability, highly resilient, low loss data storage, the metrics data store 120 can store multiple copies of the data in the same and different geographic locations and across different types of data stores (e.g., solid state, hard drive, tape, etc.). Further, as data is received at the metrics data store 120 it can be automatically replicated multiple times according to a replication factor to different data stores across the same and/or different geographic locations.

The test agent monitoring system 140 monitors and evaluates the test agent system 110 and determines whether the number of application performance testers 116 in a particular performance measurement system 112 should be modified. Furthermore, the test agent system 110 can cause a modification to the quantity of application performance testers 116. In the illustrated embodiment, the test agent monitoring system 140 includes a testing coordinator 142, a test agent system tester 144, and a job queue 146. However, it will be understood that the components of the test agent monitoring system 140 may vary across embodiments.

The testing coordinator 142 may facilitate the monitoring and evaluation of the test agent system 110 at each of the geographic locations. In particular, the testing coordinator 142 can generate jobs or instructions to verify whether there is an appropriate number of application performance testers 116 at a particular geographic location. As described in more detail herein the jobs can be communicated to the test agent system tester 144 and/or added to the job queue. The testing coordinator 142 can generate a job for a particular geographic location periodically or according to a schedule, policy, or algorithm. For example, a time-based schedule may be used so that the geographic locations are evaluated every X number of seconds, or every X minute(s), and so forth.

The test agent system tester 140 executes the jobs in the job queue 146. For example, the test agent system tester 140 obtains jobs from the job queue 146, identifies a geographic location from the job, obtains configuration data (e.g., hosting provider identifier, scaling criteria, metrics, etc.) associated with the job, obtains an identification (e.g., a quantity) of the application performance testers 116 associated with the hosting provider and the geographic location, obtains and evaluates metrics against the scaling criteria to determine whether to modify the quantity of application performance testers 116, and/or causes the hosting provider to modify the quantity of application performance testers 116.

Figure 2:
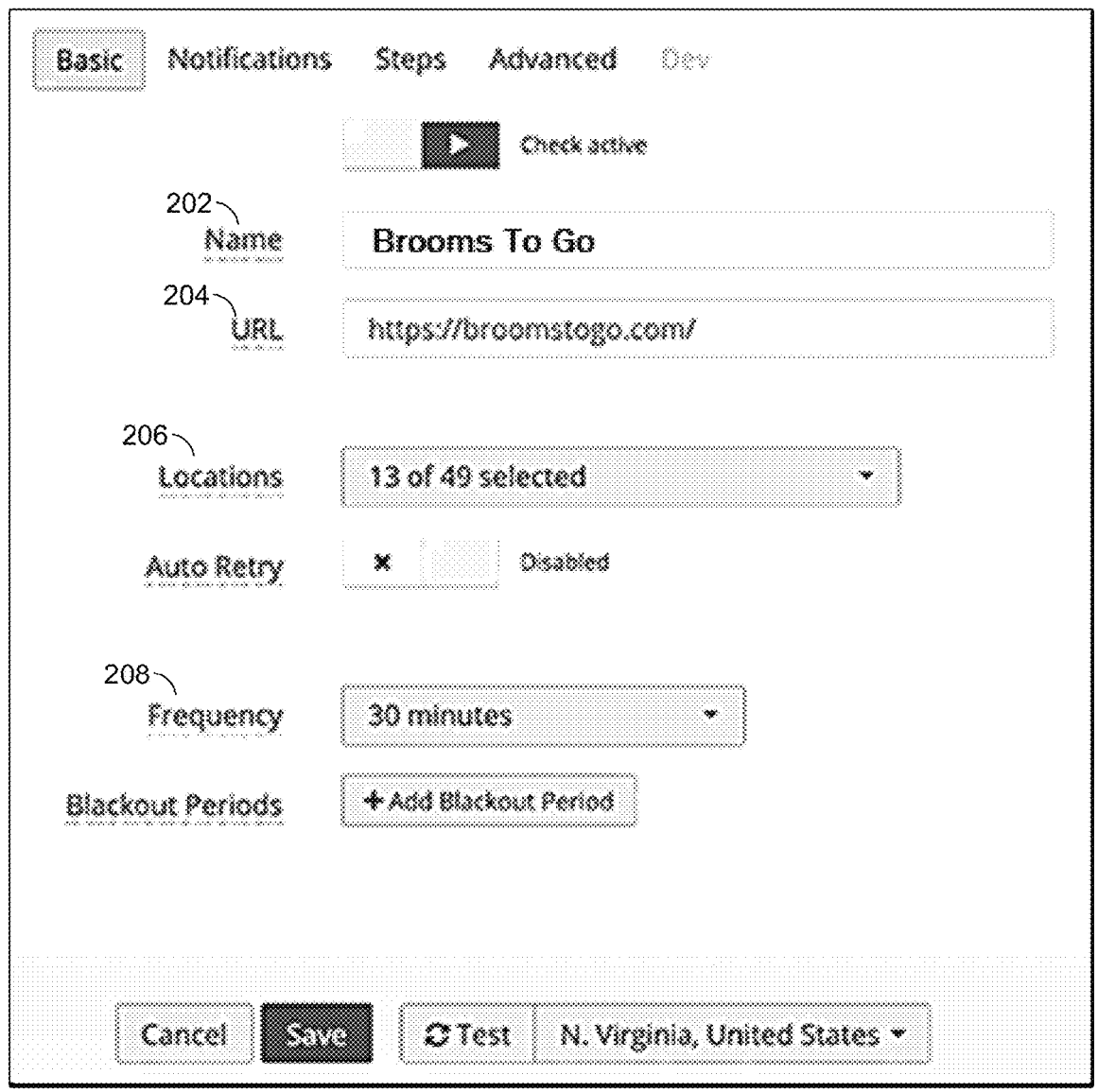
FIG. 2 illustrates an example graphical user interface by a client application that displays some available test variables.

FIG. 2 illustrates an example graphical user interface 200 by the client application 104 that displays some available test variables 202, 204, 206, 208. A user may input values for the test variables 202, 204, 206, 208 and submit a test request. Based on the test variables 202, 204, 206, 208, the client application 104 can generate jobs (to be executed by application performance testers 116) and can add the jobs to one or more application testing queues 114. In particular, in this example, the client application 104 can generate 13 recurring jobs (one for each of the 13 selected testing locations) to be performed every 30 minutes (testing frequency 208). Each of the jobs can require navigation to the URL 204 (https://broomstogo.com/). In some cases, the graphical user interface 200 may include other test variables, such as an option to input steps to be taken after navigation to the URL 204.

Figure 3:
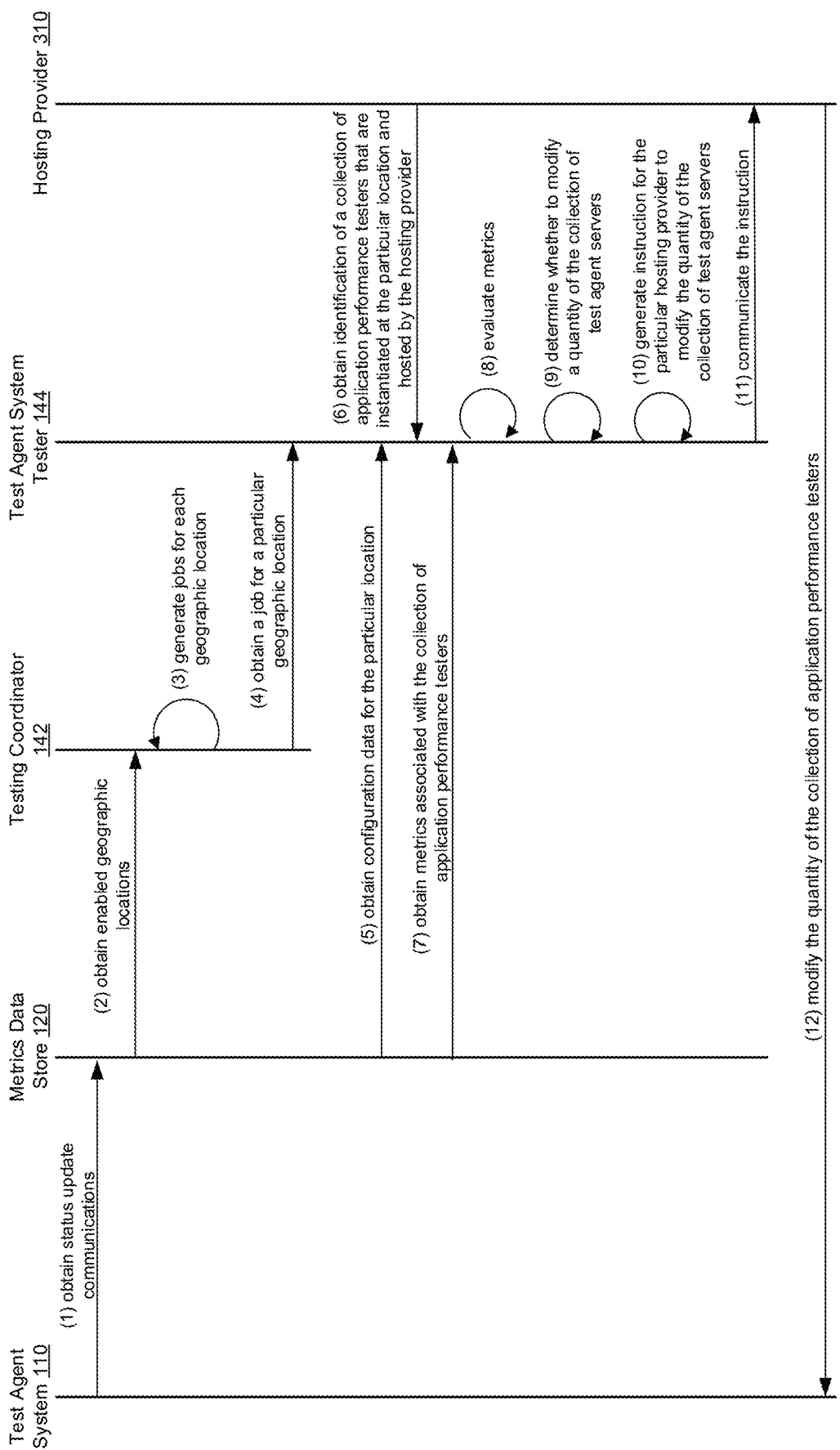
FIG. 3 is a data flow diagram illustrating an embodiment of data flow and communications illustrating an example method for evaluating a test agent system and modifying a quantity of application performance testers at a particular geographic location.

FIG. 3 is a data flow diagram illustrating an embodiment of data flow and communications between a variety of components, such as those in the application performance monitoring environment 100, for evaluating metrics associated with a test agent system 110 and generating instructions to scale the number of performance measurement systems 124 based on the metrics. The data flow diagram of FIG. 3 illustrates an example of data flow and communications between a test agent system 110, the metrics data store 120, the testing coordinator 142, the test agent system tester 144, and a hosting provider 310. However, it will be understood, that in some of embodiments, one or more of the functions described herein with respect to FIG. 3 can be omitted, performed concurrently or in a different order and/or performed by a different component of the application performance monitoring environment 100. Accordingly, the illustrated embodiment and description should not be construed as limiting.

At (1), the metrics data store 120 obtains status update communications from the test agent system 110. In some cases, the metrics data store 120 can be maintained by receiving status update communications from the test agent systems 120. Status update communications can occur periodically or according to a schedule, policy, or algorithm. For example, a time-based schedule may be used so that status update communications may be performed every X number of seconds, or every X minute(s), and so forth. In some cases, the status update communications come from the application performance testers 116. For example, the status update communications can indicate whether an application performance tester 116 is instantiated, at what geographic location it is instantiated, by which hosting provider it is instantiated, etc. In some cases, the metrics data store 120 can determine that an application performance tester 116 is unavailable or have been removed based on the status update communications or absence of status update communications from the application performance testers 116, and can update the metrics data store 120 accordingly.

At (2), the test coordinator 142 identifies geographic locations for testing. As described herein, the test agent monitoring system 140 can evaluate the metrics associated with the test agent system 110 to determine whether the number of application performance testers 116 should be increased or reduced for a particular geographic location. Accordingly, in some cases, the test coordinator 142 can identify the geographic locations that are enabled. In addition or alternatively, in some cases, the test coordinator 142 can identify geographic locations that are associated with a particular hosting provider or set of hosting providers.

To identify the geographic locations, the testing coordinator 142 can obtain indications of the geographic locations from the metrics data store 120. For example, the testing coordinator 142 may consult the metrics data store 120 to obtain identifiers of geographic locations. As another example, the testing coordinator 142 may communicate a request for the geographic locations to the metrics data store 120 and may receive an indication of the geographic locations in response. As another example, in some embodiments, the test agent monitoring system 142 passively receives the geographic locations from the metrics data store 120 without explicitly requesting the information. For example, the metrics data store 120 can be configured to periodically send the geographic locations to the test agent monitoring system 142. In some cases, the testing coordinator 142 can obtain the geographic locations from the test agent system 110, such as from one or more of the performance measurement system 112 or an application performance tester 116.

At (3), the test coordinator 142 generates one or more jobs corresponding to each of the identified geographic locations. As described herein, each job can include an instruction to monitor or evaluate computing resources at a particular geographic location. Accordingly, in some cases, each job may be geographic-specific such that a single job does not require the monitoring or evaluation of computing resources from different locations. For example, consider a scenario in which a data center located at a first geographic location includes one or more host computing devices that has a collection of application performance testers 126 instantiated thereon. In such a scenario, the test coordinator 142 may generate a job that includes evaluating some or all of the application performance testers 126 instantiated at the first geographic location. However, in this example, the job does not include evaluating any application performance testers 126 instantiated at a location other than the first geographic location.

In some cases, the test coordinator 142 can generate one or more jobs for each hosting provider. For example, consider a scenario in which a collection of application performance testers 126 are instantiated using a particular hosting service (e.g., Microsoft Azure, Google Cloud Platform, Alibaba Cloud, etc.) of a particular hosting provider (e.g., Amazon, Microsoft, Google, Alibaba, etc.). In such a scenario, the test coordinator 142 may generate a job associated with a particular provider that includes evaluating some or all of the application performance testers 126 associated with that particular hosting provider (or hosting service).

In some cases, a job may be provider-specific. For example, a particular data center or geographic location may include multiple host computing devices that are utilized by multiple hosting providers. In some such cases, a job may include evaluating only particular hosting providers at the geographic location. In other cases, the job may not be provider-specific. For example, the job may include evaluating some or all of the application performance testers 126 instantiated at the first geographic location, without regard to the provider to which the application performance testers 126 are associated. In some cases, the test coordinator 142 may generate a job that is both location- and provider-specific. For example, the test coordinator 142 may generate a job for the first geographic location that includes evaluating some or all of the application performance testers 126 that are instantiated at the first geographic location and associated with a first set of providers (e.g., one or more particular providers).

At (4), the test agent system tester 144 obtains a job to execute. In some embodiments, the test agent system tester 144 passively receives the job from the test coordinator 142 without explicitly making a request. For example, the test coordinator 142 can be configured to send the job to the test agent system tester 144 in response to the job being generated at (3). In certain embodiments, the test agent system tester 144 receives a job in response to a request made by the test agent system tester 144 to the test coordinator 142. Further still, in some cases, the test coordinator 142 may add the generated jobs to a job queue 146, and the test agent system tester 144 can pull jobs from the job queue 146. Although FIG. 3 is described as including a single test agent system tester 144, it will be understood that the test agent monitoring system 140 can include a plurality of test agent system testers 144, which can execute the jobs successively or concurrently.

At (5), the test agent system tester 144 obtains configuration data associated with the job from the metrics data store 120. In some embodiments, the test agent system tester 144 passively receives the configuration data from the metrics data store 120 without explicitly making a request. For example, the metrics data store 120 can be configured to send the configuration data to the test agent system tester 144 periodically or according to a schedule, policy, or algorithm. In certain embodiments, the test agent system tester 144 receives the configuration data in response to a request made by the test agent system tester 144 to the metrics data store 120.

In some cases, the configuration data can correspond to the particular job. For example, as described, the job can be associated with a particular geographic location and/or a particular hosting provider. In some such cases, the test agent system tester 144 can obtain configuration data that is associated with the particular geographic location and/or the particular hosting provider.

As described herein, the configuration data can include, but is not limited to, data relating to geographic locations, hosting providers, application performance testers, scaling criteria, or metrics. For example, the configuration data may include an indication of which hosting provider(s) are hosting application performance testers 116 at the particular geographic location, provider-specific scaling criteria that indicates when and/or how to scale the quantity of application performance testers 116 at the particular geographic location, metrics to be evaluated using the scaling criteria, etc.

At (6), the test agent system tester 144 obtains an identification of the collection of application performance testers 126 that are instantiated at the particular geographic location. The identification of the collection of application performance testers 126 can vary across embodiments. For example, in some cases, the identification include an indication of a quantity of application performance testers 116. For example, consider a scenario in which five application performance testers 116 are instantiated at a first location by a first hosting provider. In some such cases, the test agent system tester 144 can communicate a request to the first hosting provider for the number of application performance testers 116 that are instantiated at the first location. In response, the first hosting provider can communicate an indication that 5 application performance testers 116 are instantiated at the first location by the first hosting provider. In some cases, a particular geographic location may be associated with multiple hosting providers. In some such cases, the test agent system tester 144 may request identification from each of the hosting providers. As described herein, in some cases, the test agent system tester 144 communicates with the hosting provider and obtains the identification of the collection of application performance testers 126 by invoking a Lambda function. For example, the Lambda function can be specific to the hosting provider (and be different for different hosting providers) and can provide the hosting provider with the relevant credentials and parameters the hosting provider needs to determine the identification of the collection of application performance testers 126.

At (7), the test agent system tester 144 obtains metrics associated with the job. As described herein, in some cases, the configuration data can include an indication of how or where to obtain the metrics. For example, the configuration data and include a reference to a location or component from which the test agent system tester 144 can obtain the metrics. In some such cases, the test agent system tester 144 identifies the location and can obtain metrics from the location. Alternatively, in some cases, the metrics data store 120 may store the metrics and the test agent system tester 144 may obtain the metrics at interaction (5) as part of obtaining the configuration data.

The metrics can vary across embodiments. For example, the metrics can be associated with one or more of the components of the test agent system 110, such as the application testing queue 114 or the application performance testers 116. For example, the metrics can include, but are not limited to, a backlog of the application testing queue 114, an average backlog of the application testing queue 114 over a particular period of time, the frequency or amount of jobs being placed on the application testing queue 114, a workload of a set of application performance testers 116, the frequency or amount of jobs being placed on the application testing queue 114, etc.

At (8), the test agent system tester 144 evaluates the metrics against the set of scaling criteria, and at (9), the test agent system tester 144 determines whether to modify a quantity of the collection of application performance testers 116. As described herein, the scaling criteria can include various rules or conditions, which can be used to determine whether to modify the quantity of the collection of application performance testers 116. For example, the scaling criteria can indicate that the quantity of application performance testers 116 should be increased when certain metrics (e.g., queue backlog) satisfy a metrics threshold. As a corollary, the scaling criteria can indicate that the quantity of application performance testers 116 should be reduced when certain metrics do not satisfy a metrics threshold. Furthermore, the scaling criteria can indicate the amount by which to scale the quantity of application performance testers 116. For example, in some cases, the scaling criteria can indicate that if a first condition is present, increase the quantity of application performance testers 116 by a fixed amount and/or set the quantity of application performance testers 116 to a predetermined amount. In some cases, the scaling criteria can be location- and/or provider-specific. For example, the rules for determine when to scale may be different at different locations or for different hosting providers. It will be understood that the particular rules and conditions of the scaling criteria can vary across embodiments.

At (10), the test agent system tester 144 generates an instruction for the particular hosting provider to modify the quantity of the collection of application performance testers

116. As described herein, the instruction may include a Lambda function and may be different for different hosting providers. For example, each hosting provider may use different parameters, functions, credentials, etc. and the instruction may cause the particular hosting provider to receive its particular parameters, functions, credentials, etc. Consider a scenario in which the instruction is a Lambda function that is associated with a first hosting provider. In some such cases, invoking the Lambda function can cause communication of parameters, functions, credentials, etc. that are specific to the first hosting provider. In this way, the first hosting provider has all of the parameters it requires to perform the task of adding or deleting application performance testers 116.

In some cases, generating the instruction can include obtaining the instruction, such as from the metrics data store 120. For example, the test agent system tester 144 can receive one or more Lambda functions as part of the scaling criteria and can invoke a particular Lambda function associated with the task the test agent system tester 144 is trying to perform—i.e., modifying the quantity of the collection of application performance testers 116.

At (11), the test agent system tester 144 communicates the instruction (or parameters associated with the instruction) to the hosting provider 310. In some cases, to communicate the instruction, the test agent system tester 144 invokes the instruction. For example, consider a scenario in which the instruction is a Lambda function that is associated with a first hosting provider. In some such cases, the test agent system tester 144 may invoke the Lambda function to cause communication of parameters, functions, credentials, etc. that are specific to the first hosting provider.

In some cases, the test agent system tester 144 communicates the instruction by invoking the instruction. For example, consider a scenario in which the instruction is a Lambda function. In some such cases, the test agent system tester 144 can invoke the Lambda function to cause parameters, functions, credentials, etc. to be communicated to a particular hosting provider. For example, invoking the Lambda function can cause the test agent system tester 144 or the Lambda function itself to obtain and/or authenticate provider credentials for the particular hosting provider, determine the modification to the quantity of the collection of application performance testers 116 (e.g., add 3, remove 5, set to a total of 15, etc.), and communicate an instruction (e.g., to the hosting provider's API) to cause the modification in the quantity application performance testers 116.

Consider a scenario in which the hosting provider is Microsoft Azure. In some such cases, invoking the Lambda function may cause the following sequence of events: (1) obtain provider credentials from a parameter store, (2) authenticate the provider credential with the Azure API, (3) fetch a scale set from the Azure API, (4) calculate the new scale set size, and (5) submit the new size to the Azure API to cause the modification in the quantity application performance testers 116.

Consider a scenario in which the hosting provider is Google Cloud Platform. In some such cases, invoking the Lambda function may cause the following sequence of events: (1) obtain provider credentials from a parameter store, (2) authenticate the provider credential with the GCP API, (3) fetch a regional instance group manager from the GCP API, (4) calculate the new scale set size, and (5) submit the new size to the GCP API to cause the modification in the quantity application performance testers 116.

Consider a scenario in which the hosting provider is Alibaba. In some such cases, invoking the Lambda function may cause the following sequence of events: (1) obtain provider credentials from a parameter store, (2) fetch a current virtual machine image identifier, (3) fetch the number of application performance testers 116 running on the Alibaba API, (4) determine if additional application performance testers 116 are needed, and (5) launch an application performance tester 116 via the Alibaba API.

At (12), the hosting provider increases or reduces the quantity of the collection of application performance testers 116 based on the instruction. As described, in some cases, the hosting provider modifies the quantity of the collection of application performance testers 116 by a relative amount. For example, the hosting provider may increase the quantity by specified amount (e.g., add 2). In some cases, the hosting provider modifies the quantity of the collection of application performance testers 116 to an absolute amount. For example, the hosting provider may modify the quantity to a particular quantity (e.g., set the total to 30). In some cases, the type of modification (e.g., relative or absolute) can be based on the hosting provider. For example, some hosting providers may only accept relative changes to the quantity (e.g., add 3, remove 4, etc.), while other hosting providers may only accept absolute changes to the quantity (e.g., set quantity to 25).

In some implementations, the series of interactions of FIG. 3 can occur periodically or according to a schedule, policy, or algorithm. For example, a time-based schedule may be used so that the test agent monitoring system 140 evaluates the geographic locations every X number of seconds, or every X minute(s), and so forth.

Figure 4:
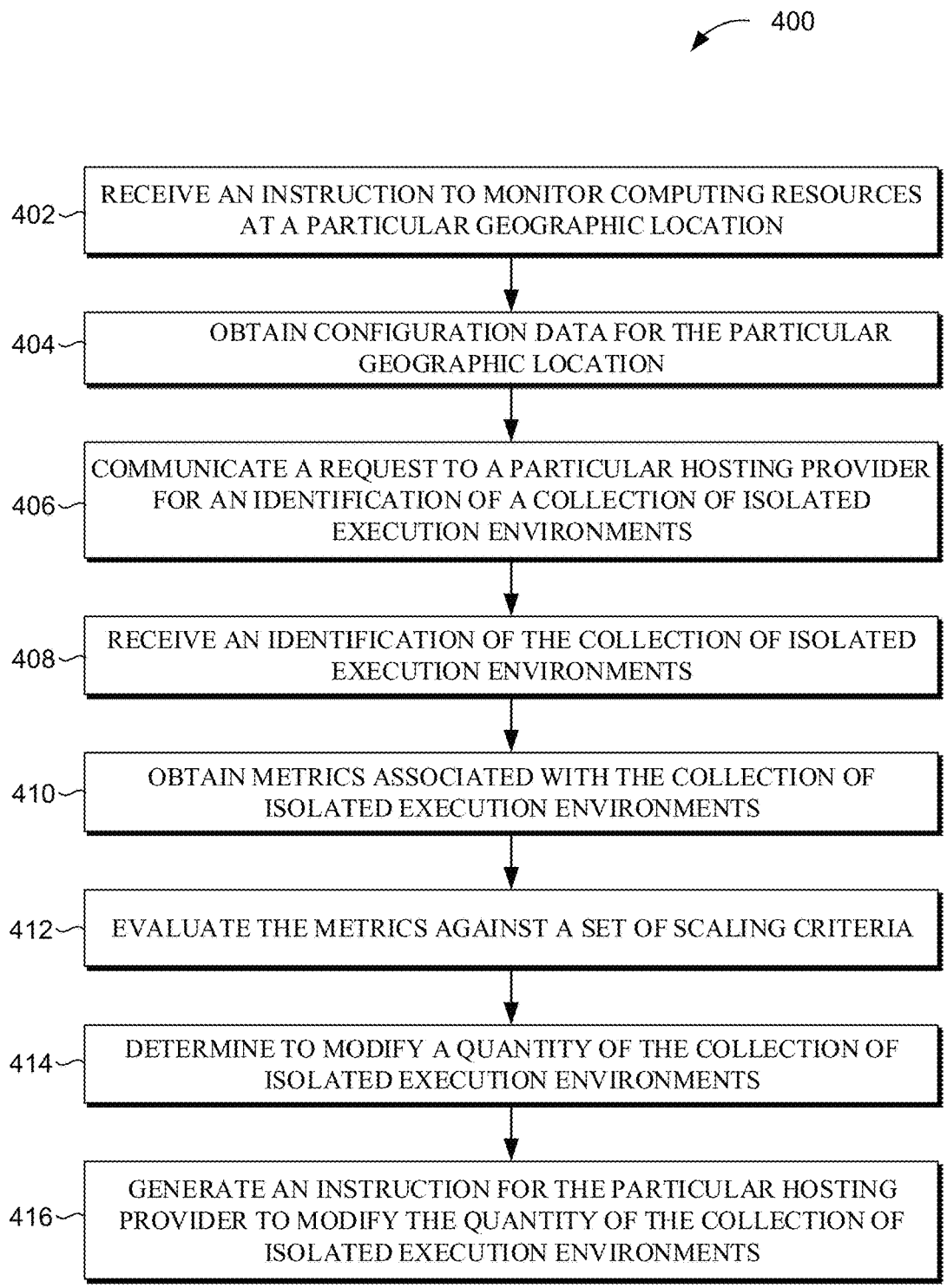
FIG. 4 is a flow diagram illustrative of an embodiment of a routine, implemented by a test agent monitoring system for evaluating a test agent system and modifying a quantity of application performance testers at a particular geographic location.

FIG. 4 is a flow diagram illustrative of an embodiment of a routine 400 implemented by a computing device of the application performance monitoring environment 100. Although described as being implemented by the test agent system tester 144, it will be understood that the elements outlined for routine 400 can be implemented by one or more computing devices/components that are associated with the application performance monitoring environment 100, such as, but not limited to, the client application 104, the metrics data store 120, the test agent system 110, the performance assessment system 130, the test agent monitoring system 140, the hosting provider, etc. Thus, the following illustrative embodiment should not be construed as limiting. Furthermore, fewer, more, or different blocks can be used as part of the routine 400.

At block 402, the test agent system tester 144 receives an instruction to monitor computing resources at a particular geographic location. As described herein, the test coordinator 142 can generate jobs to be performed by the test agent system tester 144. For example, the jobs can include evaluating metrics associated with the application performance testers 116 at particular geographic locations. Accordingly, in some cases, the instruction can include one or more jobs.

In some embodiments, the test agent system tester 144 passively receives the instruction from the test coordinator 142 without explicitly requesting the information. For example, the test coordinator 142 may generate a job and communicate the job to the test agent system tester 144. In addition or alternatively, the test agent system tester 144 can obtain the instruction by retrieving a job from the job queue 146. For example, as described, the test coordinator 142 may generate jobs and place the jobs on the queue.

At block 404, the test agent system tester 144 obtains configuration data based on the instruction. For example, as described herein, the instruction can include an indication of a first geographic location and the test agent system tester 144 can communicate the indication of the first geographic location to the metrics data store 120 to request the configuration data for the first geographic location. In response, the metrics data store 120 can communicate the configuration data to the test agent system tester 144.

The content of the configuration data can vary across embodiments. For example, in some cases, the configuration data can include the identity of some or all of hosting providers that host any application performance testers 116 at the first geographic location. As another example, in some cases, the configuration data can include a set of scaling criteria that is associated with the first geographic location and/or the hosting provider. Further still, in some cases, the configuration data includes metrics (or an indication of how/where to obtain metrics) associated with the performance measurement system 112 and/or application testing queue 114 that is associated with the first geographic location.

At block 406, the test agent system tester 144 communicates requests to the particular hosting provider for an identification of a collection of application performance testers 116 that are instantiated at the particular geographic location.

At block 408, the test agent system tester 144 receives an identification of the collection of application performance testers 116. As described, the identification of the collection of application performance testers 116 can include the number of application performance testers 116 that the hosting provider is hosting at the particular geographic location. In some cases, to receive the identification of the collection of application performance testers 116, the test agent system tester 144 invokes a Lambda function, as described herein.

At block 410, the test agent system tester 144 obtains metrics associated with the collection of application performance testers 116. As described herein, in some cases, the configuration data can include an indication of how or where to obtain the metrics. For example, the configuration data can include a reference to a location or component from which the test agent system tester 144 can obtain the metrics. In some such cases, the test agent system tester 144 may identify the location of the metrics and can obtain metrics from the location. In other cases, the test agent system tester 144 may obtain metrics from the metrics data store 120.

The metrics can vary across embodiments. For example, the metrics can include, but are not limited to, a backlog of the application testing queue 114, an average backlog of the application testing queue 114 over a particular period of time, the frequency or amount of jobs being placed on the application testing queue 114, a workload of a set of application performance testers 116, the frequency or amount of jobs being placed on the application testing queue 114, etc.

At block 412, the test agent system tester 144 evaluates the metrics against the set of scaling criteria. As described, the scaling criteria can include various rules or conditions, which can be used to determine whether to modify the quantity of the collection of application performance testers 116. Furthermore, in some cases, the scaling criteria can indicate the amount by which to scale the quantity of application performance testers 116. For example, in some cases, the scaling criteria can indicate that if a first condition is present, increase the quantity of application performance testers 116 by a fixed amount and/or set the quantity of application performance testers 116 to a predetermined amount. In some cases, the scaling criteria can be location- and/or provider-specific. For example, the rules to determine when to scale may be different at different locations or for different hosting providers. It will be understood that the particular rules and conditions of the scaling criteria can vary across embodiments.

At block 414, the test agent system tester 144 determines whether to modify the quantity of the collection of application performance testers 116. For example, using the metrics and the scaling criteria, the test agent system tester 144 can determine whether to modify their quantity. For example, the scaling criteria can indicate that the quantity of application performance testers 116 should be modified when certain metrics (e.g., queue backlog) satisfy or fail to satisfy a metrics threshold.

At block 416, the test agent system tester 144 generates an instruction for the particular hosting provider to modify the quantity of the collection of isolated execution environments. As described herein, the test agent system tester 144 can generate the instruction by invoking a provider-specific Lambda function that is different from Lambda functions for other providers. When invoked, the Lambda function may obtain a set of common parameters and a set of provider-specific parameters and communicate the parameters to the particular hosting provider. In response, the hosting provider may modify the quantity of the application performance testers 116 in accordance with the instruction.

Terminology

Computer programs typically include one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may include software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may include computer files, variables, programming arrays, programming structures, or any electronic information storage schemes or methods, or any combinations thereof, suitable for the purposes described herein. User interface elements described herein may include elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components described herein can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources.

When implemented as a cloud-based service, various components described herein can be implemented using containerization or operating-system-level virtualization, or other virtualization technique. For example, one or more components can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
   receiving an instruction to test performance of a webpage using computing resources associated with a geographic location, wherein the webpage is hosted by a remotely located computing device;
   in response to receiving the instruction to test the performance of the webpage, obtaining configuration data associated with the geographic location, wherein the configuration data includes:
      an identity of a hosting provider hosting one or more isolated execution environments, each of the one or more isolated execution environments instantiated at the geographic location on one or more respective host computing devices in a shared computing resource environment, a particular host computing device of the one or more respective host computing devices sharing compute resources with a plurality of isolated execution environments, and
      a set of scaling criteria associated with the hosting provider and indicating criteria for modifying a quantity of the one or more isolated execution environments;
   communicating a request to the hosting provider for an identification of the one or more isolated execution environments;
   in response to the request, receiving the identification of the one or more isolated execution environments;
   obtaining metrics based at least in part on communication between the one or more isolated execution environments and the webpage;
   evaluating the metrics based at least in part on the set of scaling criteria;
   determining to modify the quantity of the one or more isolated execution environments based at least in part on evaluating the metrics; and
   generating an instruction for the hosting provider to modify the quantity of the one or more isolated execution environments.

2. The method of claim 1, wherein the geographic location is selected from a plurality of geographic locations, and wherein a respective one or more isolated execution environments are instantiated at each of the plurality of geographic locations.

3. The method of claim 1, wherein the geographic location is selected from a plurality of geographic locations, wherein a respective one or more isolated execution environments are instantiated at each of the plurality of geographic locations, and wherein the respective one or more isolated execution environments are configured to communicate with the particular webpage and collect respective metrics associated with communication between the respective one or more isolated execution environments and the webpage.

4. The method of claim 1, wherein obtaining the configuration data comprises obtaining the configuration data from a remote storage system.

5. The method of claim 1, wherein the configuration data comprises location information associated with the geographic location.

6. The method of claim 1, wherein the geographic location is selected from a plurality of geographic locations, and wherein the configuration data comprises location information associated with each of the plurality of geographic locations.

7. The method of claim 1, wherein the configuration data comprises information indicating how to obtain the metrics, wherein obtaining the metrics comprises obtaining the metrics based at least in part on the information indicating how to obtain the metrics.

8. The method of claim 1, wherein the configuration data comprises information indicating how to obtain the metrics, wherein the information indicating how to obtain the metrics is based at least in part on the geographic location.

9. The method of claim 1, wherein the geographic location is selected from a plurality of geographic locations.

10. The method of claim 1, wherein the metrics are associated with a backlog on a queue.

11. The method of claim 1, wherein each isolated execution environment of the one or more isolated execution environments is configured to:
    communicate with the webpage;
    obtain a respective portion of the metrics; and
    send results for processing.

12. The method of claim 1, wherein each isolated execution environment of the one or more isolated execution environments is configured to:
    pull one or more respective jobs from a queue; and
    execute the one or more respective jobs.

13. The method of claim 1, wherein generating the instruction for the hosting provider comprising invoking a Lambda function specific to the hosting provider.

14. The method of claim 1, wherein generating the instruction for the hosting provider comprising invoking a Lambda function specific to the hosting provider, wherein invoking the Lambda function causes the hosting provider to modify the quantity of the one or more isolated execution environments by a specific number.

15. The method of claim 1, wherein generating the instruction for the hosting provider comprising invoking a Lambda function specific to the hosting provider, wherein invoking the Lambda function causes the hosting provider to set the quantity of the one or more isolated execution environments to a specific quantity.

16. A computing system comprising:
   memory; and
   one or more processors coupled to the memory and configured to:
      receive an instruction to test performance of a webpage using computing resources associated with a geographic location, wherein the webpage is hosted by a remotely located computing device;
      in response to receiving the instruction to test the performance of the webpage, obtain configuration data associated with the geographic location, wherein the configuration data includes:
         an identity of a hosting provider hosting one or more isolated execution environments, each of the one or more isolated execution environments instantiated at the geographic location on one or more respective host computing devices in a shared computing resource environment, a particular host computing device of the one or more respective host computing devices sharing compute resources with a plurality of isolated execution environments, and
         a set of scaling criteria associated with the hosting provider and indicating criteria for modifying a quantity of the one or more isolated execution environments;
      communicate a request to the hosting provider for an identification of the one or more isolated execution environments;
      in response to the request, receive the identification of the one or more isolated execution environments;
      obtain metrics based at least in part on communication between the one or more isolated execution environments and the webpage;
      evaluate the metrics based at least in part on the set of scaling criteria;
      determine to modify the quantity of the one or more isolated execution environments based at least in part on evaluating the metrics; and
      generate an instruction for the hosting provider to modify the quantity of the one or more isolated execution environments.

17. The computing system of claim 16, wherein the geographic location is selected from a plurality of geographic locations, and wherein a respective one or more isolated execution environments are instantiated at each of the plurality of geographic locations.

18. The computing system of claim 16, wherein the configuration data comprises information indicating how to obtain the metrics, wherein to obtain the metrics the one or more processors are configured to obtain the metrics based at least in part on the information indicating how to obtain the metrics.

19. Non-transitory computer readable media comprising computer-executable instructions that, when executed by a computing system, cause the computing system to:
   receive an instruction to test performance of a webpage using computing resources associated with a geographic location, wherein the webpage is hosted by a remotely located computing device;
   in response to receiving the instruction to test the performance of the webpage, obtain configuration data associated with the geographic location, wherein the configuration data includes:
      an identity of a hosting provider hosting one or more isolated execution environments, each of the one or more isolated execution environments instantiated at the geographic location on one or more respective host computing devices in a shared computing resource environment, a particular host computing device of the one or more respective host computing devices sharing compute resources with a plurality of isolated execution environments, and
      a set of scaling criteria associated with the hosting provider and indicating criteria for modifying a quantity of the one or more isolated execution environments;
   communicate a request to the hosting provider for an identification of the one or more isolated execution environments;
   in response to the request, receive the identification of the one or more isolated execution environments;
   obtain metrics based at least in part on communication between the one or more isolated execution environments and the webpage;
   evaluate the metrics based at least in part on the set of scaling criteria;
   determine to modify the quantity of the one or more isolated execution environments based at least in part on evaluating the metrics; and
   generate an instruction for the hosting provider to modify the quantity of the one or more isolated execution environments.

20. The non-transitory computer readable media of claim 19, wherein the geographic location is selected from a plurality of geographic locations, and wherein a respective one or more isolated execution environments are instantiated at each of the plurality of geographic locations.

* * * * *